United States Patent [19]
Berche et al.

[11] Patent Number: 5,995,715
[45] Date of Patent: Nov. 30, 1999

[54] METHOD AND APPARATUS FOR REDUCING STRIP EFFECT CAUSED BY PRINTERS

[75] Inventors: Stéphane Berche, Paris; Yifeng Wu, Palaiseau; Pierre L. Lermant, Paris, all of France

[73] Assignee: Oce-Technologies B.V., Ma Venlo, Netherlands

[21] Appl. No.: 08/656,791

[22] Filed: May 31, 1996

[30] Foreign Application Priority Data

May 31, 1995 [FR] France ................................ 95 06452

[51] Int. Cl.$^6$ ............................ G06K 15/02; H04N 1/50; B41J 2/145; B41J 2/21
[52] U.S. Cl. ............................ 395/109; 358/502; 347/41; 347/43
[58] Field of Search ............................ 395/109; 358/502, 358/533, 534, 454, 456, 298; 347/12, 40, 41, 43

[56] References Cited

U.S. PATENT DOCUMENTS

| | | |
|---|---|---|
| 4,748,453 | 5/1988 | Lin et al. . |
| 4,967,203 | 10/1990 | Doan et al. . |
| 4,999,646 | 3/1991 | Trask .......................................... 347/41 |
| 5,610,634 | 3/1997 | Murata et al. ............................. 347/41 |
| 5,818,474 | 10/1998 | Takahashi et al. ........................ 347/12 |

FOREIGN PATENT DOCUMENTS

| | | |
|---|---|---|
| 471 488 | 2/1992 | European Pat. Off. . |
| 06 32405 A2 | 1/1995 | European Pat. Off. . |

OTHER PUBLICATIONS

"Halftone image quality analysis based on a human vision model" Quian Lin, published in Proceedings SPIE Human Vision, Visual Processing and Digital Display, IV 1–4, Feb. 1993.

Efficient Design of Large Threshold Arrays for Accurate Tone Reproduction, Pierre Lermant, published in IS& T's 48th Annual Conference Proceedings, May 7–11, 1995, by "The Society for Imaging Science and Technology".

*Primary Examiner*—Scott Rogers

[57] ABSTRACT

A method and apparatus for printing images wherein printing of individual dots is controlled by employing binary masks. M different complementary binary masks each having the form of a matrix of points occupying N rows and P columns are defined in such a manner that each of the N×P elements of a mask has a first binary value or a second binary value, each point of the matrix corresponding to an element having the first binary value in one mask and in one mask only. Each portion of the image is printed in M passes of the print head while using the M different masks in succession, such that during each pass, the print head scans a strip of the print medium, the same mask being used repetitively for each group of P columns and N rows, an image dot being released for printing during a pass when the corresponding element of the mask has the first binary value. The masks used are of sufficiently large dimensions to avoid perceptible repetitive patterns appearing, the elements having the first binary value being distributed therein in a manner that is pseudo-random and substantially uniform.

34 Claims, 12 Drawing Sheets

METHOD AND APPARATUS FOR REDUCING STRIP EFFECT CAUSED BY PRINTERS

TECHNICAL FIELD OF INVENTION

The invention relates to printing images with dots by way of a multi-dot print head, and in particular, to a method and apparatus for improving images printed by an ink jet printer.

DESCRIPTION OF RELATED ART

Ink jet printing is performed by way of a print head that moves relative to a print medium on which an image is to be reproduced. Usually, the print head is displaced in a first scan direction (main scan) while the print medium is displaced in a second scan direction perpendicular to the first (secondary scan).

The print head includes a plurality of orifices through which droplets of ink can be ejected in controlled manner, e.g., by electrostatic force or by vaporizing, i.e., causing bubbles of vapor to be formed.

The ejection orifices are aligned in a transverse direction relative to the main scan direction. Thus, on each scan of the print head, with the print medium being stationary, printing may be performed on a strip of the medium that includes a plurality of lines, i.e., as many lines as there are ejection orifices. Printing may be one-directional, i.e., with image strips all being printed while the print head moves in the same direction (no printing during head return), or it may be two-directional, i.e., with image strips being printed alternately during each movement of the print head along the main scanning direction.

When an image strip is printed in a single pass, i.e., in a single scan of the head, and when the print medium is advanced between two passes through a distance equal to the width of one image strip, then print quality is not always good because of the "strip" effect. As shown in FIG. 1, the image appears to be striped or composed of a series of strips. This strip effect is more visible with two-directional printing (FIG. 1) as compared with one-directional printing (FIG. 2).

In addition, when printing in color and using a plurality of heads for different primary colors, single-pass printing sometimes gives rise to colors being rendered irregularly. In particular, the droplets form spots that overlap slightly on the print medium which is an anisotropic environment. Insufficient drying time between the projection of contiguous ink spots can result in undesirable color mixing.

To overcome these difficulties, proposals have been made to print not in one pass but in two passes, with only half of the image dots (or "pixels") of an image strip being released for printing during the first pass and with the other half being released during the second pass, and with the print medium being advanced through a distance equal to half the width of an image strip between the two passes. During each pass, the image dots released for printing are distributed spatially in predetermined complementary patterns or "masks". The two-pass printing method can be generalized to a number of passes greater than two, with an increase in the number of passes having the effect of improving the final quality of the image, but to the detriment of printing speed. One such method of printing in a plurality of interlaced passes is described in document U.S. Pat. No. 4,967,203.

Although a clear improvement in print quality is achieved by printing in a plurality of passes as proposed in the prior art, the improvement is still insufficient when a very high quality image is desired.

SUMMARY OF INVENTION

An object of the present invention is to propose a method which produces a very high quality image.

To this end, the invention provides a method of printing images by dots using at least one multi-dot print head that is movable relative to a print medium, in which method includes the steps of:

a) generating a set of M different complementary binary masks in which each mask is in the form of a matrix of points occupying N rows and P columns, where M, N, and P are integers greater than 1, such that:

each of the N×P elements of a mask has a first binary value or a second binary value; and each point of the matrix corresponds to an element having the first binary value in one mask and in one mask only; and b) printing each portion of the image with M passes of the print head, using M different masks in succession, whereby:

during each pass, the print head scans a strip of the print medium, with the same mask being used repetitively for each pass (N rows); and printing of an image dot is allowed during a pass when the corresponding element of the mask has the first binary value.

This method is further characterized by using masks that have dimensions that are sufficiently large to avoid perceptible repetitive patterns appearing, and in which the elements having the first binary value are distributed pseudo-randomly and substantially uniformly.

Preferably, each of the masks has substantially the same number of first binary value elements.

In the present case, the term "mask of sufficiently large dimensions" means a mask whose dimensions N and P are such that the probability of spurious repetitive effects (or "artifacts") visible to the eye is greatly reduced. Experience shows that the eye has increased sensitivity for certain pattern repetition pitches, e.g., of vertical lines or horizontal lines. The critical value r for pattern repetition pitch when an image at a distance of viewing at 25 cm, i.e., the pitch value for which the eye presents the greatest sensitivity, is about 1 mm, which corresponds to an angular offset between patterns as seen at the focus of the eye of about 0.2°. This phenomenon is well known: reference may be made in particular to the article by Quian In entitled "Half-tone image quality image based on human vision model" published in "Proceedings SPIE Human Vision, Visual Processing and Digital Display", IV 1–4 February 1993.

The width and the height covered by a mask must be considerably greater than this critical pitch, and thus typically considerably greater than r=1 mm for viewing the image at a distance of at 25 cm. The values of N and P are therefore selected accordingly, taking account of the resolution of the image, i.e., of the fundamental pitch p between image dots. If p is expressed in mm, N and P should therefore be chosen so that N×p>>r and P×p>>r. Using ink jet print heads in which the pitch between ejection orifices is typically 0.07 mm, the values of N and P should therefore be considerably greater than 16 and preferably at least equal to 64 for viewing at 25 cm. The value of P may also be equal to the value of N, but that is not essential.

The term "mask in which the elements having the first binary value are distributed pseudo-randomly and substantially uniformly" means herein a mask which is not constructed by repeating a pattern of smaller dimensions, but in which the first binary values are distributed in relatively homogenous manner so as to avoid artifacts being formed due to the presence of zones in which the density of dots having the first binary value is very low or very high.

It should be observed here that by using masks of large dimensions with pseudo-random distribution, the method of the invention differs radically from the prior art methods mentioned at the beginning of the present application, since those methods use masks having dimensions N×P=4×4 or 8×8, or masks formed by repeating a unit pattern having those dimensions.

The method of the invention therefore presents a solution to the problem of constructing masks of large dimensions having a distribution that is pseudo-random while nevertheless remaining substantially uniformly distributed.

Another object of the present invention is to propose an apparatus which produces a very high quality image. This object is achieved by constructing an apparatus that implements the inventive method. More particularly, this object is achieved by programming a general purpose computer with the inventive method. Alternatively, this object is achieved by constructing a special purpose computer that implements the inventive method.

Further scope of applicability of the present invention will become apparent from the detailed description given hereinafter, However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein:

FIG. 6 is a view showing a portion of a pseudo-random thresholding matrix suitable for constructing masks for use in implementing the method of the invention;

FIGS. 7A and 7B are fragmentary views of two complementary masks obtained from the matrix of FIG. 6;

FIGS. 8A and 8B are fragmentary views of two other complementary masks obtained from the matrix of FIG. 6;

DETAILED DESCRIPTION OF PREFERRED EMBODIMENTS

Figure 3:
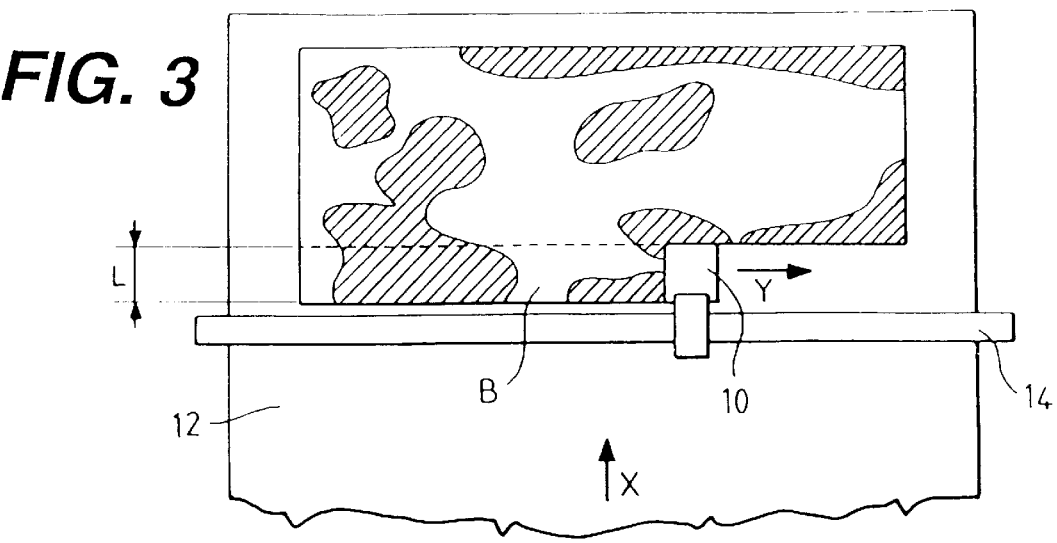
FIG. 3 is a diagrammatic representation of an ink jet printer.
Figure 4:
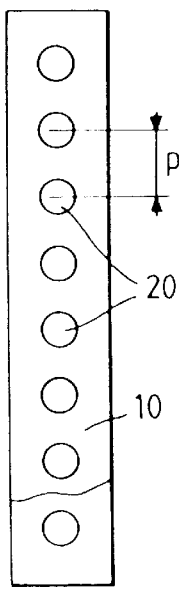
FIG. 4 is a diagrammatic representation of an ink jet print head.

As shown in FIG. 3, an ink jet printer includes a print head 10 movable along a Y direction (main scan direction) relative to a print medium 12, e.g., a sheet of paper. The print head is guided along a guide bar 14 which extends transversely relative to the sheet 12. The sheet is moved in an X direction (secondary scan direction) perpendicular to the Y direction. Typically, the print head 10 includes at least one column of orifices 20 (FIG. 4) through which ink droplets can be ejected in a controlled manner. The orifices 20 are aligned parallel to the X direction, or possibly slightly inclined relative thereto.

An image is reproduced by scanning successive strips B of width L on the sheet 12 by moving the head 10 in the Y direction (main scan). During a scan pass, the ejection of ink is controlled so as to reproduce the desired image in the form of dots on a number of lines equal to the number of orifices 20. After each pass, the sheet 12 is advanced in the X direction (the secondary scan direction) and the print head is controlled to perform a new scan pass. Printing preferably is performed only while the print head is moving in the same direction (one-directional mode), with the head being returned to its starting position each time the sheet is advanced. Strips B may also be printed while displacing the head alternately in one direction and in the opposite direction (two-directional mode).

Figure 5A:
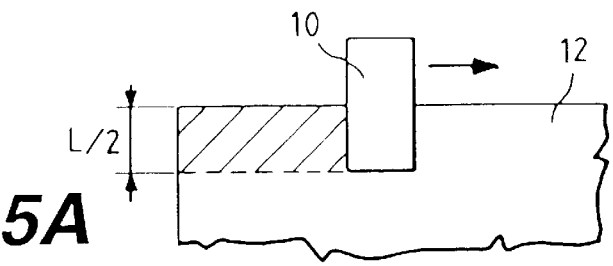
FIGS. 5A, 5B, and 5C are diagrams showing successive steps in two-pass printing.
Figure 5B:
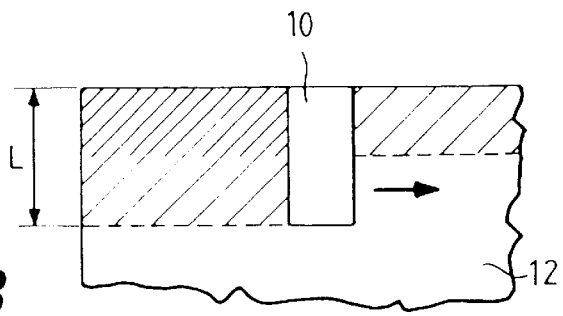
Figure 5C:
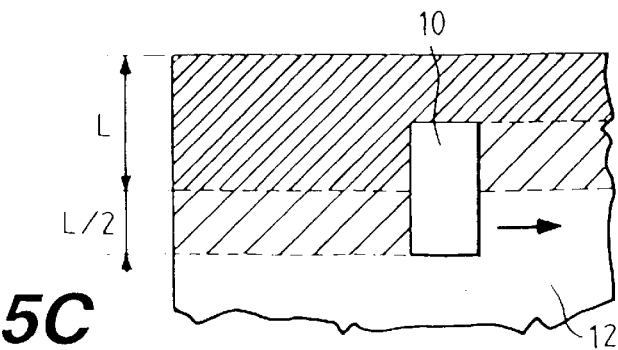

The inventive method employs a multi-pass mode of printing, i.e., a print mode in which each strip B is printed in a plurality of passes of the print head, preferably in interlaced manner, as shown in FIGS. 5A–C for two-pass printing.

At the beginning of printing, a half-strip B is printed using the bottom half of the ejection orifices of the head 10 (FIG. 5A). The sheet 12 is advanced through a distance L/2 and a full strip is printed, using the complete column of ejection orifices (FIG. 5B) to fill in the half-strip already printed and to print another half-strip. Thereafter, the sheet is advanced again through a distance L/2 and another full strip is printed using the complete column of ejection orifices (FIG. 5C). The process is repeated until the last half-strip of the sheet is reached, which is printed using only the top half of the ejection orifices.

On each pass, only one half of the image dots ("pixels") are allowed to print, with the other half being allowed to print during the following pass. Binary masks in the form of matrices of points having N rows by P columns are used to control which image dots are allowed to print during each pass. During a printing pass, for successive groups of P image dot columns, image dots are optionally released for printing by controlling the ejection orifices selectively depending on whether the elements in the corresponding locations of the mask have a first binary value or a second binary value (e.g., 1 or 0). During the following pass, a complementary mask is used so that all image dots are released for printing in two passes. In the secondary scan direction (X), the masks are repeated for each group of N rows.

The print mode can be generalized to a number of passes M greater than 2. The sheet of paper 12 is then advanced a certain number of rows (L/M) between each pass such that after M passes the total advance is equal to L, and M different masks are used. Each image dot corresponds to an element having the value 1 in one and only one of the M masks.

Figure 14:
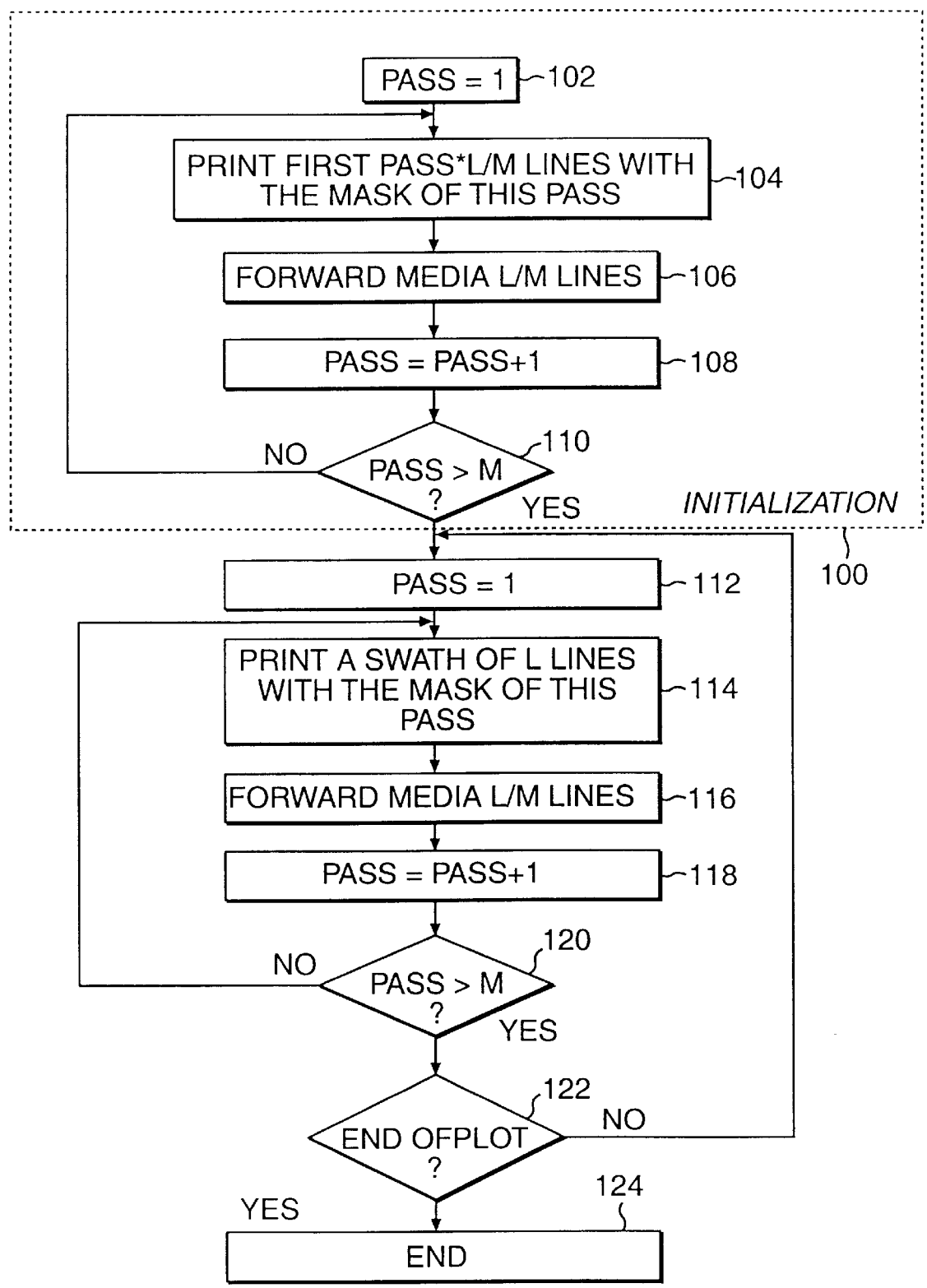
FIG. 14 is a flow chart outlining the generalized multi-pass printing method of the present invention.

FIG. 14 illustrates the generalized multi-pass printing procedure. The initialization procedure 100 initializes the multi-pass printing procedure as is appropriate when, for example, the print head 10 begins printing at the top of a sheet as in FIGS. 5A–B. The initialization procedure begins with step 102 which sets a counter PASS=1 and then proceeds to step 104 which prints a pass on L/M lines (where M is the number of passes and L is the number of lines per swath) using a first mask. Then, step 106 forwards the print medium 12 by L/M lines. After updating the counter PASS= PASS+1 in step 108, step 110 tests the counter PASS (if PASS>M, then the proceed to step 112, else go to step 104 to continue the initialization procedure 100).

At step 112, the counter is reset (PASS=1). Then, a swath of L lines is printed in step 114 using a mask for this PASS. After printing, step 116 forwards the print medium 12 by L/M lines and step 118 increments the counter (PASS= PASS+1). Step 120 then tests the counter: if PASS>M then proceed to step 122 else go to step 114 and print another swath. Step 122 then tests if this is the end of the plot: if no then go to step 112 and reset the counter PASS=1, else proceed to the end step 124.

The mask elements having the value 1 (1-value elements) are preferably distributed substantially equally between masks. They are distributed in pseudo-random and quasi-uniform manner in each mask so that the tiling of a surface by the mask does not cause the appearance of a repetitive pattern that is visible to the eye.

Naturally, multi-pass printing can be performed in a one-directional mode or in a two-directional mode.

In addition, multi-pass printing may be performed in a monochrome mode or in a color mode. In a color mode, a plurality of print heads are used like the print head shown in FIG. 4, with each print head allocated to one color. Usually, four print heads are used for the colors cyan, magenta, and yellow, and for the color black. Color printing is then performed in four passes with four different masks and with the masks for the various colors being permutated during successive passes. Naturally, the number of passes with four print heads is not necessarily equal to four. It could be smaller, being at least equal to two or more, using a corresponding number of masks.

The masks may be constructed in various ways to satisfy the distribution conditions for the 1-values whereby they are required to be pseudo-random and quasi-uniform.

In a first implementation, the masks are made from a matrix of numbers distributed in pseudo-random manner. Each mask element is assigned a binary number (the first binary value or the second binary value) as a function of the value of the number of the corresponding point in the matrix.

By way of example, the matrix of numbers can be a thresholding matrix of the type typically used for converting continuous tone images into binary tone images (i.e., halftone images). One method of constructing such a thresholding matrix, referred to below as the Minimum Energy Value method or as the MEV method, is described in an article by Pierre Lermant, published in IS & T's 48th Annual Conference Proceedings, May 7–11, 1995, by "The Society for Imaging Science and Technology", Springfield, Va., United States of America.

Such thresholding matrices created by the MEV method are capable of satisfying the requirements for distribution that is pseudo-random and quasi-uniform and may be used as the basis for generating the masks of this invention.

When the number of passes M is equal to 2, both masks are constructed from a thresholding matrix having the same dimensions, as a function of the values of the numbers in the matrix. When the numbers forming the matrix are consecutive integers, one of the two masks may be constructed by allocating the first binary value to elements whose corresponding locations in the matrix are occupied by even numbers, and the other mask is complementary thereto.

Figure 6:
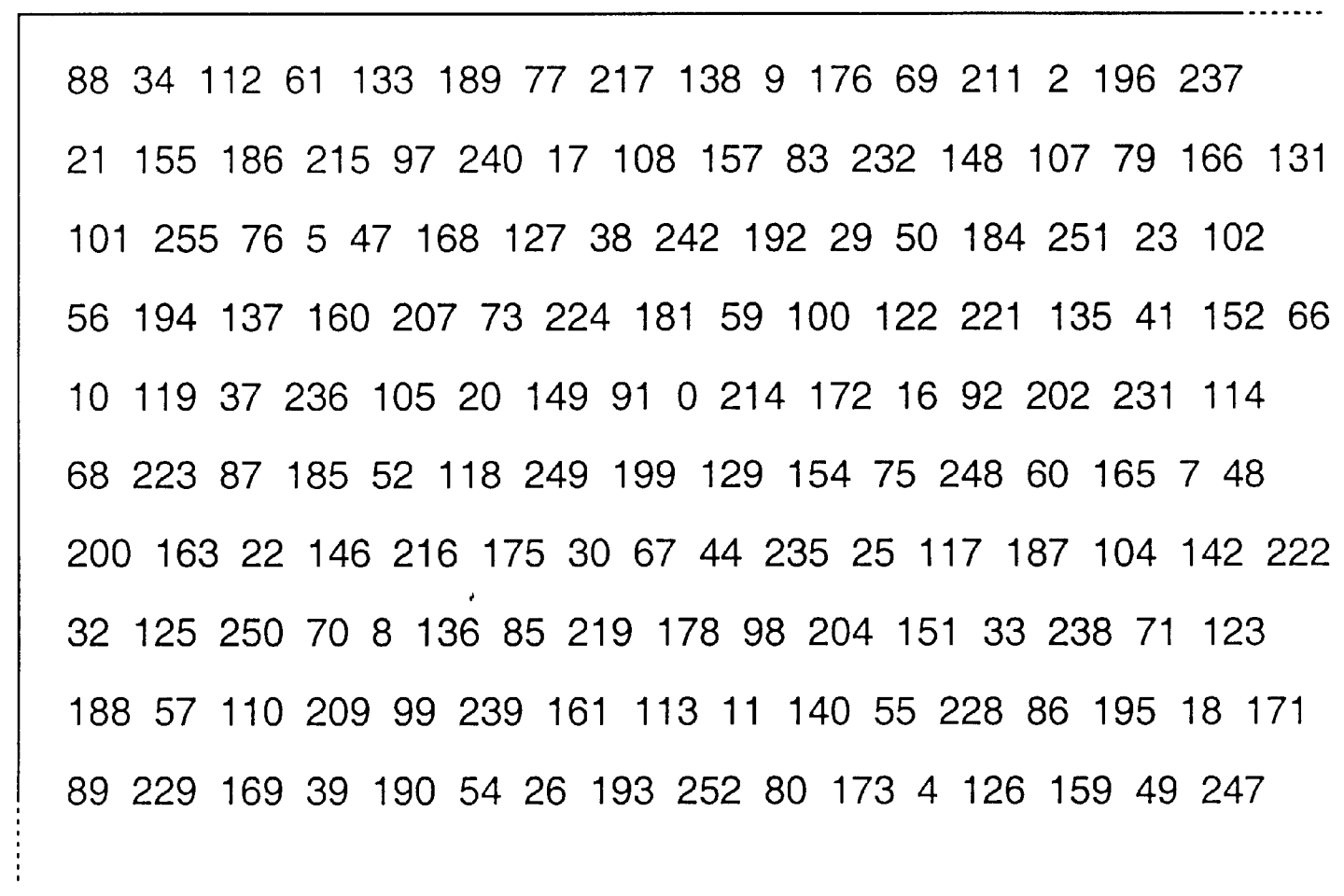
Figures 7A, 7B, 8A, 8B:
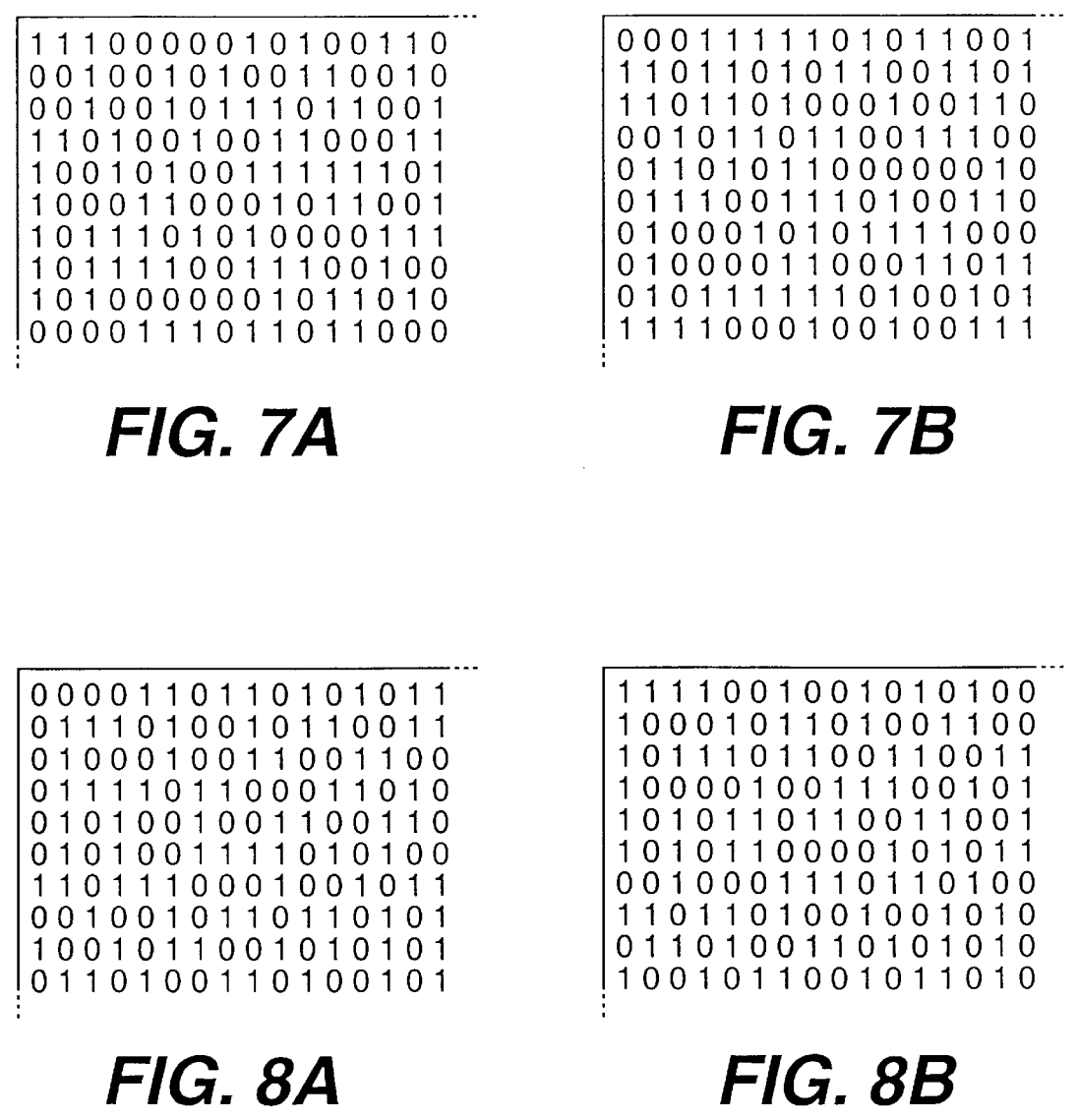

FIG. 6 shows a portion of a random thresholding matrix comprising numbers in the range 0 to 255, and FIGS. 7A and 7B show the corresponding portions of two complementary masks constructed in this way.

In a variant, one of the two masks may be constructed by allocating the first binary value to elements whose corresponding locations in the matrix are occupied by a number situated on one side or the other of a threshold value, with the other mask being complementary thereto. By way of example, the threshold value may be the mean value of the numbers in the matrix. FIGS. 8A and 8B show portions of two complementary masks constructed in this way on the basis of the matrix of FIG. 6, with the mean value being 128. Uniformity appears to be better ensured with this second variant than with the first. It may also be observed that this second variant does not require the numbers constituting the matrix to be consecutive integers. The threshold value is chosen as a function of the numbers constituting the matrix so that each mask contains a desired number of elements having the first binary value.

When the number M of masks is greater than 2, a matrix of numbers distributed in random manner such as a thresholding matrix obtained by the MEV method may be used to construct the M masks. By way of example, each mask can then be constructed by allocating the first binary value to elements whose locations correspond to numbers in the matrix lying within a predetermined range of values, with the ranges allocated to different masks being contiguous, without mutual overlap, and preferably being of the same width. In other words, each mask would have an associated, unique number range which is used to allocate the first binary value to elements of the mask where the corresponding number on the matrix falls with that number range.

In a second implementation of the inventive method, which is more particularly suitable when the number of masks is greater than 2, masks are constructed directly by a sequential positioning method. The location of an element having the first binary value in one mask being determined without taking into account the locations of elements having the first binary value which are allocated to other masks, but while nevertheless preventing a location that is already occupied by an 1-value element in another mask from being occupied again by an 1-value. By way of example, principles similar to those of the MEV method described in the above-mentioned article by Pierre Lermant are used.

Starting from an empty N×P matrix, that algorithm in successively selects points having minimum energy value, or MEV points.

The M masks may be constructed one after another, or else in parallel. When they are constructed one after the other, a first mask is made starting from an empty matrix and allocating the value 1 to elements whose locations correspond to the MEV points which are identified in succession, while taking into account the points that have already been placed.

Figure 9A:
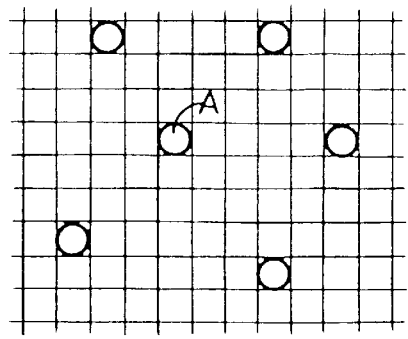
FIGS. 9A, 9B, 10A, and 10B show steps in the construction of masks in a particular implementation of the invention.
Figure 9B:
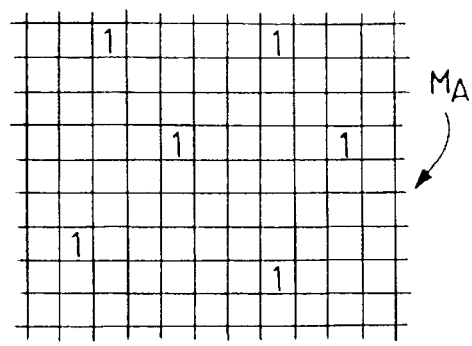

FIG. 9A uses circles to represent MEV points placed in succession in the matrix, the point A being the last-placed point, taking into account of locations already allocated. FIG. 9B is a translation of the MEV point locations into 1-value elements in the first mask $M_A$.

This procedure is repeated until the desired number of 1-value elements has been placed in the first mask, e.g., N×P/M elements (or the closest integer) when it is desired that all of the masks should contain substantially the same number of 1-value elements.

A second mask is made in the same way, i.e., not taking into account the MEV points identified for making the first mask, but preventing MEV points being placed at corresponding locations in the second mask that are already occupied by MEV points in the first mask.

Figure 10A:
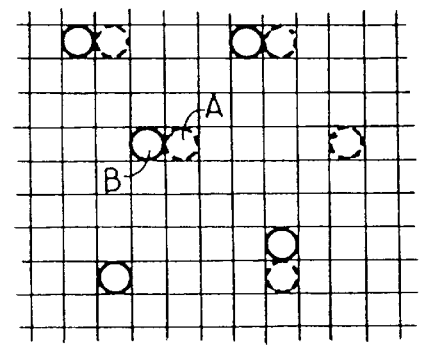
Figure 10B:
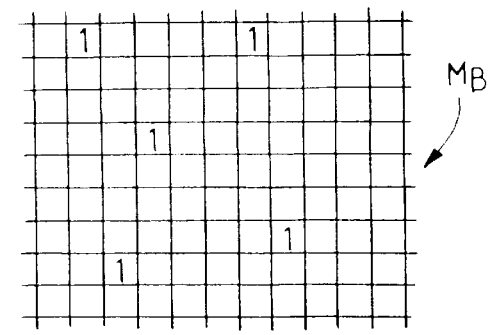

This is illustrated in FIG. 10A where solid line circles show the locations in the matrix of MEV points placed during the process of constructing the second mask, while dashed-line circles show the locations of MEV points for the first mask. These first mask points are considered as being "virtual" for the process of creating the second mask. That is to say, the theoretical locations of MEV points for the second mask are determined without taking account of the MEV points corresponding to the first mask, but each MEV point for the second mask is actually placed so as to avoid occupying in the matrix a location corresponding to an MEV point of the first mask. Thus, the MEV point of the second mask, given reference B, whose theoretical location coincides with that of point A is, in practice, placed adjacent to point A. FIG. 10B shows the portion of the second mask $M_B$ that corresponds to FIG. 10A. By taking account of the locations of the MEV points in the first mask, it is possible to ensure that the 1-value is not given to an element having the same location in both the first mask and the second mask.

The procedure continues in similar manner for the following masks, taking no account of the MEV points for the preceding masks when looking for MEV point locations for the current mask, but ensuring that points are not placed in locations that have already been occupied when drawing up the preceding masks. The number of elements having the value 1 in the first mask is determined so that the total number of 1-value elements in all of the masks equals the number N×P.

Figure 15:
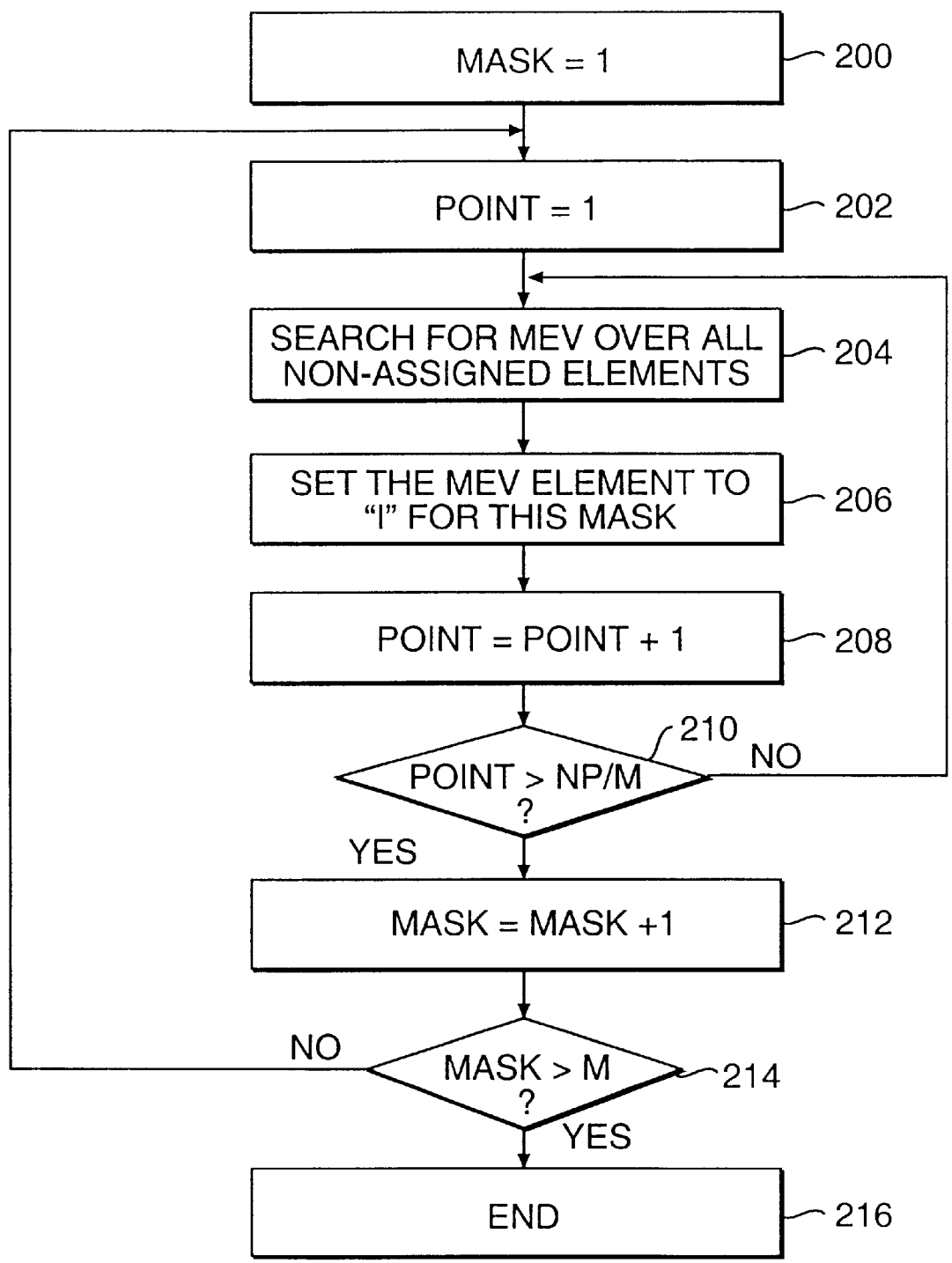
FIG. 15 is a flow chart outlining the method of constructing M masks sequentially.

FIG. 15 illustrates a more particular example of the procedure used for constructing masks sequentially. The sequential mask generation procedure shown in FIG. 15 begins at step 200 which sets a mask counter MASK=1 and then proceeds to step 202 which sets a point counter POINT=1. Then, step 204 searches for an MEV point location over all non-assigned elements. The results of this search are used on step 206 to set or assign the value 1 to a mask. Then, the point counter is updated in step 208: POINT=POINT+1. This point counter is then tested in step 210: if POINT>NP/M (where N is the number of rows in the mask, P is the number of columns in the mask, M is the number of passes, and NP/M is the number of points to be turned-on in a mask) then proceed to step 212 else go to step 204.

Step 212 updates the mask counter: MASK=MASK+1. A test is then made in step 214 on the mask counter: if MASK>M then proceed to end step 216, else go to step 202 to generate the next mask. Using this procedure, masks can be sequentially generated.

In the second case, masks are constructed in parallel as follows:

a) a search is made for a first MEV point in an empty matrix and the element of the first mask whose location corresponds to that of the MEV point is given the value 1;

b) a search is made for a first MEV point in an empty matrix, without taking account of the first MEV point corresponding to the first mask, and the value 1 is allocated to the element of the second mask whose location corresponds to that of the first MEV point searched in this way, while ensuring that it does not occupy the location of the element having the value 1 in the first mask;

c) successively, and for each remaining mask, a search is made for the first MEV point without taking account of the locations of the first MEV points for the preceding masks, and the value 1 is allocated to the location corresponding to that of the searched-for MEV points, however it is prevented from occupying the location of any element having the value 1 in the preceding masks;

d) once all of the first elements in the M masks have been placed, a search is made for the second MEV point of the first mask, taking account of the first MEV point already placed in the first mask, but considering the first MEV points for the other masks as being virtual points, i.e., not taking them into account while searching for the second MEV point of the first mask, but nevertheless ensuring that locations already occupied by MEV points for the other masks are not selected again, and the value 1 is allocated to the location of the first mask corresponding to the location of the second MEV point as determined in this manner;

e) placing the second 1-value element of each remaining mask in the same manner, i.e., taking account of the first MEV point for the same mask while searching for the second MEV point, and considering the MEV points for the other masks as virtual points; and f) proceeding in similar manner for the following 1-value elements until all M searched-for complementary masks have been obtained, i.e., until N×P 1-value elements have been placed.

Figure 16:
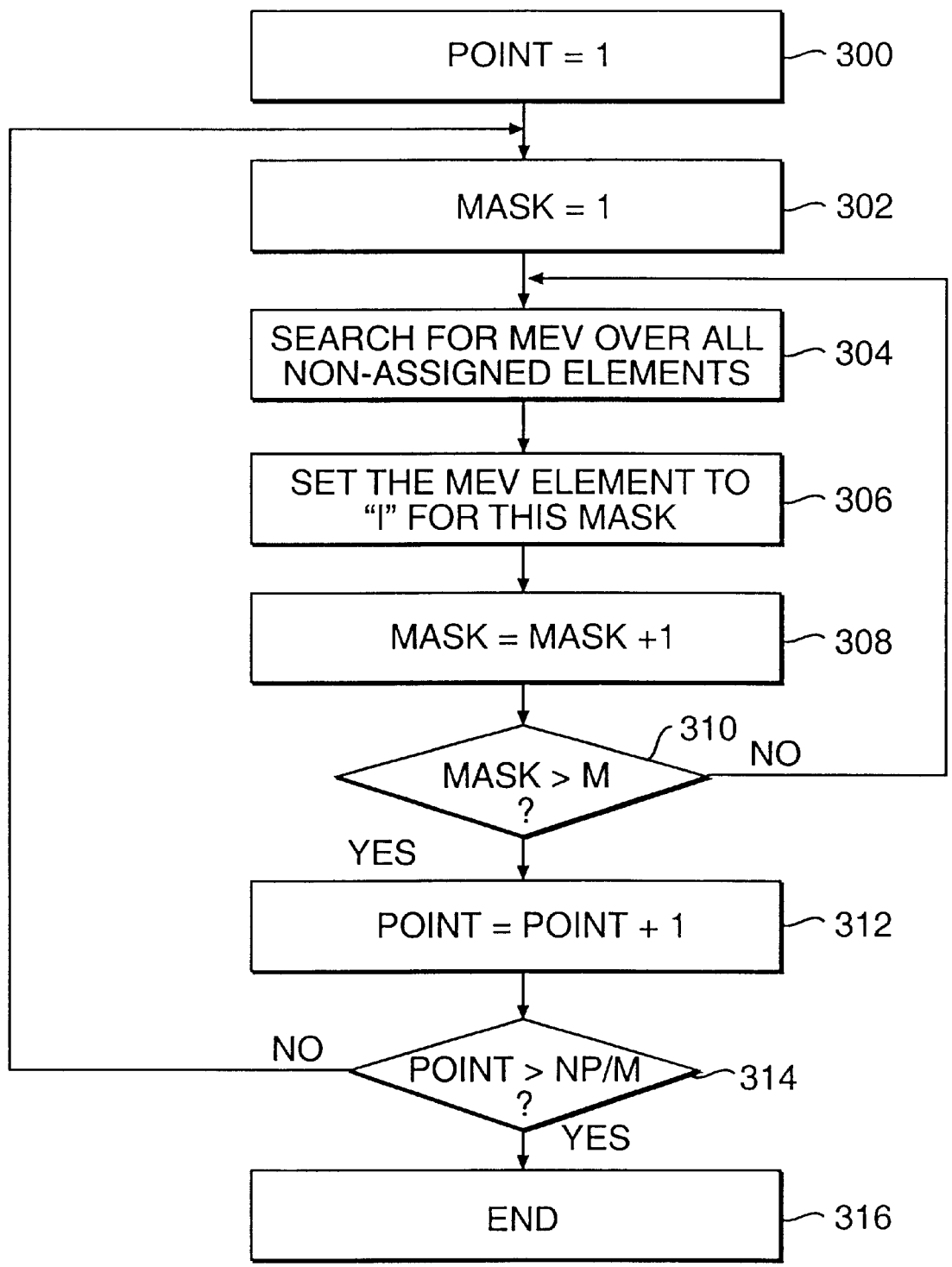
FIG. 16 is a flow chart outlining the method of constructing M masks in parallel.

FIG. 16 illustrates a more particular example of the procedure used for constructing masks in parallel. The parallel mask generation procedure shown in FIG. 16 begins at step 300 which sets a point counter POINT=1 and then proceeds to step 302 which sets a mask counter MASK=1. Then, step 304 searches for an MEV point location over all non-assigned elements. The results of this search are used on step 306 to set or assign the value 1 to a mask. Then, the mask counter is updated in step 308: MASK=MASK+1. A test is then made in step 310 on the mask counter: if MASK>M then proceed to step 312, else go to step 304 to search for and assign the next mask a 1-value.

Step 312 updates the point counter: POINT=POINT+1. This point counter is then tested in step 314: if POINT>NP/M (where N is the number of rows in the mask, P is the number of columns in the mask, M is the number of passes, and NP/M is the number of points to be turned-on in a mask) then proceed to end step 316 else go to step 302 to search for and assign the next point to each of the masks. Using this procedure, masks can be generated in parallel.

The process of constructing masks in series or in parallel, as described above, can be used with methods of constructing matrices other than the MEV method. References to other methods of constructing thresholding matrices can be found, for example, in the above-mentioned article by Pierre Lermant.

A two-pass mode print method has been implemented using an ink jet printer having a print head with 64 ejection orifices disposed at a pitch of about 0.07 mm.

Two complementary masks of dimensions 64×64 were used, after being constructed in the manner illustrated by FIGS. 6, 7A, and 7B.

Figure 1:
FIG. 1 is a reproduction of an image obtained by way of an ink jet printer operated in two-directional single-pass mode.
Figure 2:
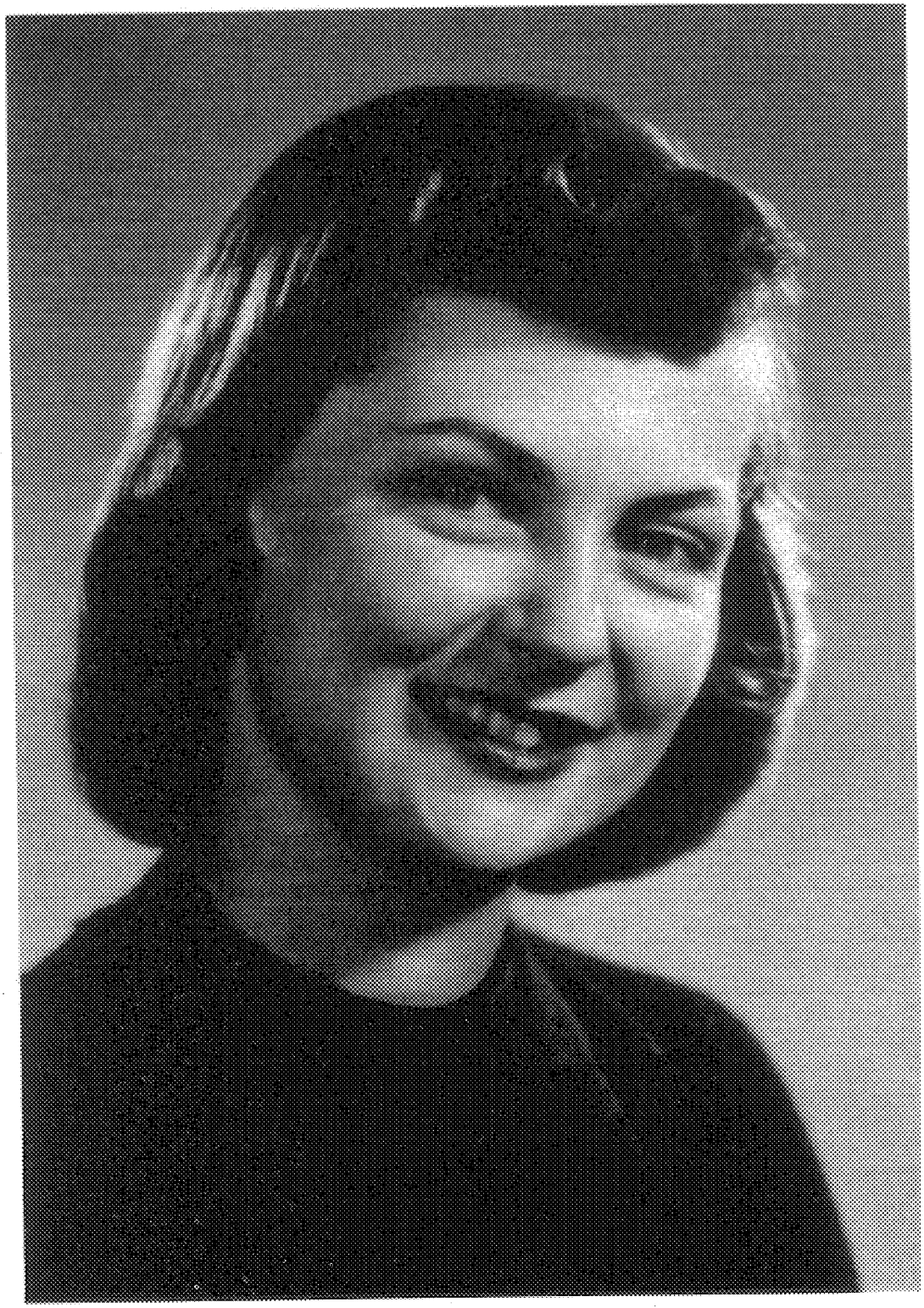
FIG. 2 is a reproduction of an image obtained by way of an ink jet printer operated in one-directional and single-pass mode.
Figure 11:
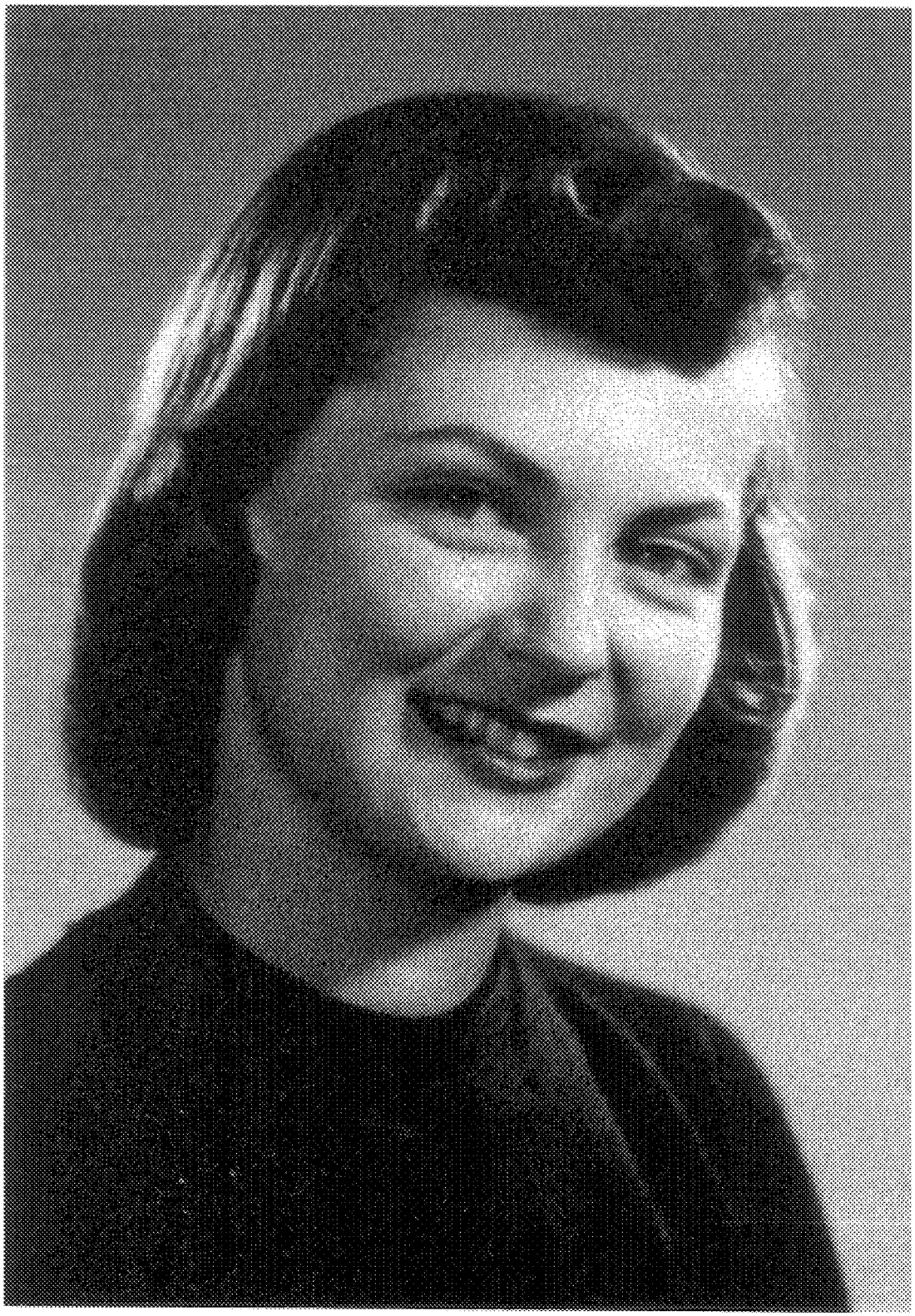
FIG. 11 is a reproduction of an image obtained by way of an ink jet printer operated in two-directional mode with two interlaced passes using masks of the invention.
Figure 12:
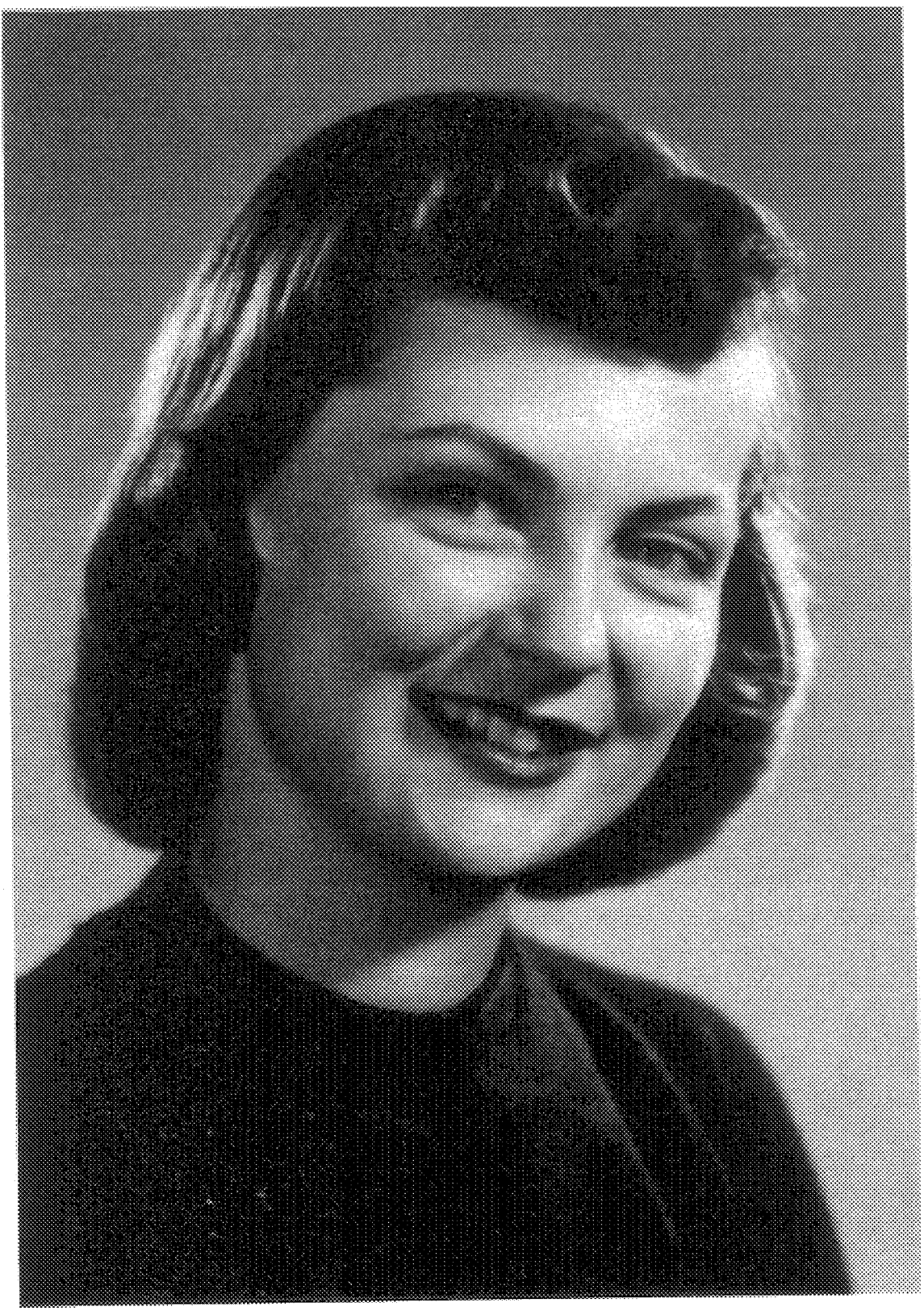
FIG. 12 is a reproduction of an image obtained by way of an ink jet printer operated in one-directional mode with two interlaced passes using masks of the invention.

FIGS. 11 and 12 show the results obtained in two-directional and one-directional modes, respectively. The improvement in image quality compared with FIGS. 1 and 2 is considerable.

In a multi-pass print method, the positions of image dots printed during each pass are interrelated and form a partial image. The positions relating to these partial images depend on the mechanical accuracy of the machine. If each mask is made up of a majority of isolated points, excessive shift between two passes will cause points that are theoretically separate to become superposed and will cause gaps to be left, thereby considerably degrading the quality of the image. This effect is not visible so long as the error E in the positioning pitch of the head is such that E<D−p, where D is the diameter of the ink spot formed on the print medium and p is the fundamental pitch between image dots, with D being selected to be greater than p so as to ensure that there is overlap between two spots projected for two adjacent image dots on the same line.

When D−p<E<p, portions of the image that ought to be covered in ink run the risk of not being covered because of two spots corresponding to two contiguous image dots being spaced apart excessively. Under such circumstances, defects can be attenuated by ensuring that each row of the mask is formed by groups of at least two consecutive elements having the same value. To guarantee this result, complementary masks are constructed having dimensions of N×P/2 and each element of each line is duplicated so as to obtain masks of dimensions N×P that are used during printing. For example, a mask of dimensions N×P/2 having a row with values 10110 . . . would be duplicated to form a mask having a row with values 1100111100 . . . and dimensions N×P.

Alternatively, complementary masks of dimensions N×P obtained as described above can be used for this purpose by omitting the same P/2 consecutive columns in each mask after duplicating the elements, e.g., the first P/2 columns or the last P/2 columns.

The above is illustrated in FIGS. 13A to 13M.

Figure 13:
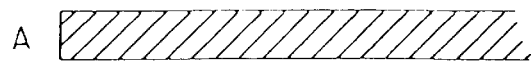
FIGS. 13A, 13B, 13C, 13D, 13E, 13F, 13G, 13H, 13I, 13J, 13K, 13L, and 13M show the effects of offsets between successive passes with masks in which elements having a first binary value or a second binary value are to be found in alternating positions along a line, or are grouped together in pairs.
Figure 13:
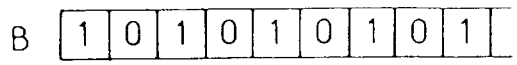
Figure 13:
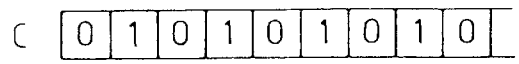
Figure 13:
Figure 13:
Figure 13:
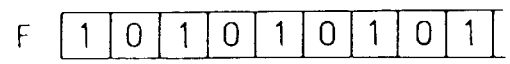
Figure 13:
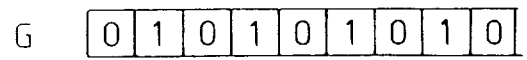
Figure 13:
Figure 13:
Figure 13:
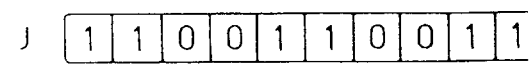
Figure 13:
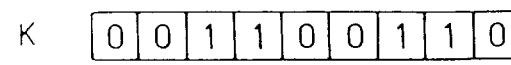
Figure 13:
Figure 13:

FIG. 13A shows a line of an image that is to be printed continuously in black, and FIGS. 13B and 13C show the first two rows of two complementary masks in which the 1-value elements are isolated.

When the shift or slip between two passes is zero or almost zero, then the image line is printed as shown in FIG. 13D, which shows the result obtained after the first pass using the first mask, and by FIG. 13E which shows the final result after the second pass using the second mask.

When a shift E occurs, the first and the second masks are applied as shown by FIGS. 13F and 13G. FIGS. 13H and 13I show the results obtained after one pass and then after two passes. Gaps, or omissions, I are visible, with E being such that E>D−p.

If the elements of the masks are duplicated as described above and the same shift E occurs (FIGS. 13J and 13K), the results obtained after one pass and then after two passes are shown by FIGS. 13L and 13M. In FIG. 13M, it can be seen that defects are considerably attenuated in comparison with FIG. 13I.

Figure 17:
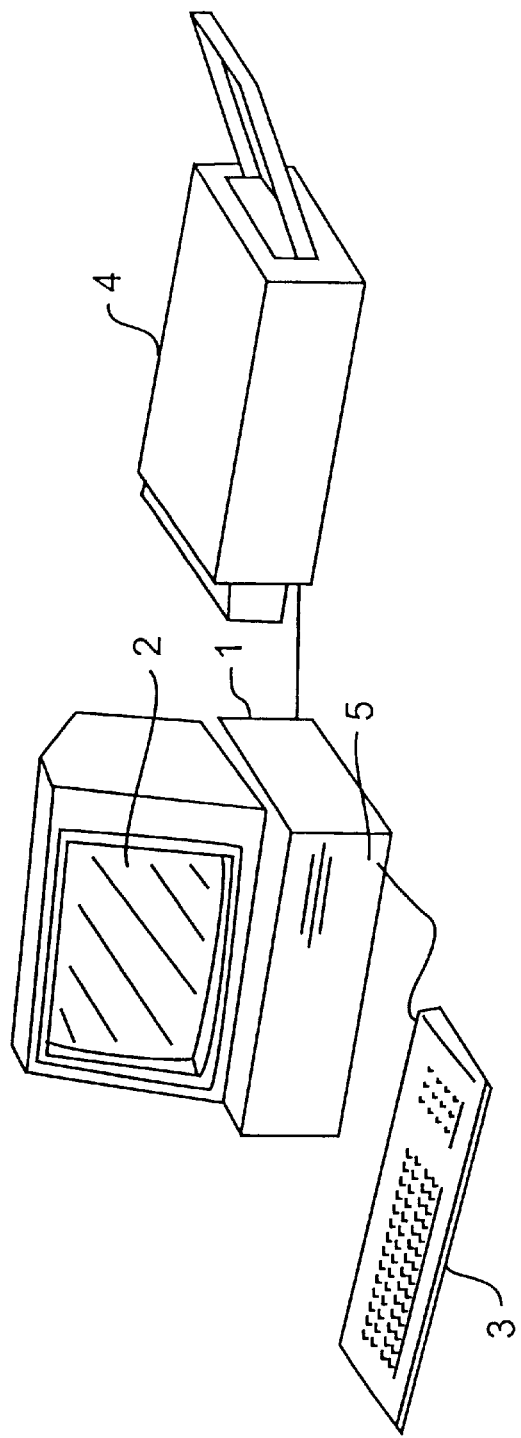
FIG. 17 is a perspective view of a general purpose computer system that can be programmed with the inventive method.

The inventive method described above can also be implemented as an apparatus. For example, the general purpose computer system shown in FIG. 17 could be programmed with the inventive method. FIG. 17 depicts a computer system including computer 1, keyboard 3, disk drive 5, display 2 and printer 4 that can be programmed with the inventive method. Alternatively, the invention may be embodied in a special purpose machine which has the inventive method hard-wired therein with, for example, a PROM chip. In other words, the invention may be implemented in either hardware or software or a combination of hardware and software as is apparent to those of ordinary skill in the art.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of printing images with dots using at least one multi-dot print head that is movable relative to a print medium, comprising the steps of:
   a) generating a set of M different complementary binary masks in which each mask is in the form of a matrix of elements occupying N rows and P columns, where M, N, and P are integers greater than 1, such that:
      each of the N×P elements of the masks has a first binary value or a second binary value; and
      each point of the matrix corresponds to an element having the first binary value in one mask and in one mask only;
   b) printing each portion of the image in M passes of the print head, using M different masks in succession, including the substeps of
      (i) scanning the print head across a strip of N rows and using the same mask during each pass and a different, complementary mask for each successive scan; and
      (ii) printing an image dot during a pass when the corresponding element of the mask has the first binary value;
      wherein the masks have dimensions N×P that are sufficiently large to avoid perceptible repetitive patterns appearing, and in which the elements of the masks having the first binary value are distributed pseudo-randomly and substantially uniformly; and
      choosing the integers N and P so that N×p>>r and P×p>>r where p is the fundamental pitch between two image dots, and r is the critical pitch for pattern repetition at which a human eye presents maximum sensitivity.

2. The method according to claim 1, said generating step further including the substep of assigning substantially the same number of first binary value elements to each of the masks.

3. The method according to claim 1, further comprising the step of applying the method to ink jet printing wherein multi-dot the print head includes at least one column of ejection orifices for ejecting ink droplets.

4. The method according to claim 3, wherein the integer N is equal to the number of ejection orifices.

5. The method according to claim 1, wherein the integers N and P are equal.

6. The method according to claim 1, said generating step further including the substeps of:
placing numbers in an N×P matrix in pseudo-random manner,
allocating the first binary value or the second binary value to each element of the masks as a function of the value of the number at the corresponding point in the matrix.

7. A method of printing images with dots using at least one multi-dot print head that is movable relative to a print medium, comprising the steps of:
a) generating a set of M different complementary binary masks in which each mask is in the form of a matrix of elements occupying N rows and P columns, where M, N, and P are integers greater than 1, such that:
each of the N×P elements of the masks has a first binary value or a second binary value; and
each point of the matrix corresponds to an element having the first binary value in one mask and in one mask only; and
b) printing each portion of the image in M passes of the print head, using M different masks in succession, including the substeps of
(i) scanning the print head across a strip of N rows and using the same mask during each pass and a different, complementary mask for each successive scan; and
(ii) printing an image dot during a pass when the corresponding element of the mask has the first binary value;
wherein the masks have dimensions N×P that are sufficiently large to avoid perceptible repetitive patterns appearing, and in which the elements of the masks having the first binary value are distributed pseudo-randomly and substantially uniformly,
wherein the integers N and P are equal to or greater than 16.

8. The method according to claim 7, wherein the integers N and P are equal to or greater than 64.

9. The method according to any one of claims 1 to 2 and 3 to 5, further comprising the steps of:
printing color images using a plurality of different print heads each corresponding to one color,
allocating the masks amongst the print heads by permutating the masks during successive passes.

10. A method of printing images with dots using at least one multi-dot print head that is movable relative to a print medium, comprising the steps of:
a) generating a set of M different complementary binary masks in which each mask is in the form of a matrix of elements occupying N rows and P columns, where M, N, and P are integers greater than 1, such that:
each of the N×P elements of the masks has a first binary value or a second binary value; and
each point of the matrix corresponds to an element having the first binary value in one mask and in one mask only; and
b) printing each portion of the image in M passes of the print head, using M different masks in succession, including the substeps of
(i) scanning the print head across a strip of N rows and using the same mask during each pass and a different, complementary mask for each successive scan; and
(ii) printing an image dot during a pass when the corresponding element of the mask has the first binary value;
wherein the masks have dimensions N×P that are sufficiently large to avoid perceptible repetitive patterns appearing, and in which the elements of the masks having the first binary value are distributed pseudo-randomly and substantially uniformly,
said generating step including the substeps of
placing numbers in an N×P matrix in pseudo-random manner, and
allocating the first binary value or the second binary value to each element of the masks as a function of the value of the number at the correspnonding point in the matrix
wherein the integer M is equal to 2 and said allocating substep allocates the first binary value or the second binary value to each element of each of a first mask depending on whether the corresponding number of the matrix is even or odd, and said generating step generates a second mask from the complement of the first mask.

11. A method of printing images with dots using at least one multi-dot print head that is movable relative to a print medium, comprising the steps of:
a) generating a set of M different complementary binary masks in which each mask is in the form of a matrix of elements occupying N rows and P columns, where M, N, and P are integers greater than 1, such that:
each of the N×P elements of the masks has a first binary value or a second binary value; and
each point of the matrix corresponds to an element having the first binary value in one mask and in one mask only; and
b) printing each portion of the image in M passes of the print head, using M different masks in succession, including the substeps of
(i) scanning the print head across a strip of N rows and using the same mask during each pass and a different, complementary mask for each successive scan; and
(ii) printing an image dot during a pass when the corresponding element of the mask has the first binary value;
wherein the masks have dimensions N×P that are sufficiently large to avoid perceptible repetitive patterns appearing, and in which the elements of the masks having the first binary value are distributed pseudo-randomly and substantially uniformly;
said generating step including the substeps of
placing numbers in an N×P matrix in pseudo-random manner; and
allocating the first binary value or the second binary value to each element of the masks as a function of the value of the number at the corresponding point in the matrix;
said allocating substep allocating the first binary value to elements of the M-th mask whose locations correspond to numbers in the matrix that are within an M-th predetermined range of values,
wherein the M predetermined ranges for the M masks are contiguous and non-overlapping.

12. A method of printing images with dots using at least one multi-dot print head that is movable relative to a print medium, comprising the steps of:
a) generating a set of M different complementary binary masks in which each mask is in the form of a matrix of elements occupying N rows and P columns, where M, N, and P are integers greater than 1, such that:

each of the N×P elements of the masks has a first binary value or a second binary value; and each point of the matrix corresponds to an element having the first binary value in one mask and in one mask only; and b) printing each portion of the image in M passes of the print head, using M different masks in succession, including the substeps of (i) scanning the print head across a strip of N rows and using the same mask during each pass and a different, complementary mask for each successive scan; and (ii) printing an image dot during a pass when the corresponding element of the mask has the first binary value;

wherein the masks have dimensions N×P that are sufficiently large to avoid perceptible repetitive patterns appearing, and in which the elements of the masks having the first binary value are distributed pseudo-randomly and substantially uniformly;

said generating step including the substeps of:

allocating the first binary value to an element of one of the masks without taking into account locations of first binary values previously allocated to other masks; and ensuring that said allocating step does not allocate the first binary value to a mask location which has already been allocated a first binary value.

13. The method according to claim 12, said generating step generating the masks with a sequential positioning method including the substep of seeking locations with minimum energy values to allocate the first binary values.

14. The method according to claim 12, said ensuring substep further including the substeps of:

identifying when said allocating step allocates the first binary value to a mask location which has already been allocated a first binary value, and reallocating one of the identified first binary values to a mask location adjacent to an mask original location of the reallocated first binary value.

15. The method according to claim 12, wherein said masks are generated sequentially and the method further comprises the steps of:

iterating said allocating and said ensuring steps a number of times substantially equal to NP/M for each mask; and repeating said iterating step M times to generate M masks.

16. The method according to claim 12, wherein said masks are generated in parallel and the method further comprises the steps of:

iterating said allocating and said ensuring steps M times with a different mask being processed at each iteration; and repeating said iterating step a number of times substantially equal to NP/M.

17. A method of printing images with dots using at least one multi-dot print head that is movable relative to a print medium, comprising the steps of:

a) generating a set of M different complementary binary masks in which each mask is in the form of a matrix of elements occupying N rows and P columns, where M, N, and P are integers greater than 1, such that:

each of the N×P elements of the masks has a first binary value or a second binary value; and each point of the matrix corresponds to an element having the first binary value in one mask and in one mask only; and b) printing each portion of the image in M passes of the print head, using M different masks in succession, including the substeps of (i) scanning the print head across a strip of N rows and using the same mask during each pass and a different, complementary mask for each successive scan; and (ii) printing an image dot during a pass when the corresponding element of the mask has the first binary value;

wherein the masks have dimensions N×P that are sufficiently large to avoid perceptible repetitive patterns appearing, and in which the elements of the masks having the first binary value are distributed pseudo-randomly and substantially uniformly, said generating step generating masks in which each row is made up of groups of the first binary value and groups of the second binary value where each group includes at least two consecutive points of the same value.

18. An apparatus for printing images with dots using at least one multi-dot print head that is movable relative to a print medium, comprising:

a) generating means for generating a set of M different complementary binary masks in which each mask is in the form of a matrix of elements occupying N rows and P columns, where M, N, and P are integers greater than 1, such that:

each of the N×P elements of the masks has a first binary value or a second binary value; and each point of the matrix corresponds to an element having the first binary value in one mask and in one mask only; and b) printing means for printing each portion of the image in M passes of the print head, using M different masks in succession, including (i) scanning means for scanning the print head across a strip of N rows and using the same mask during each pass and a different, complementary mask for each successive scan; and (ii) printing means for printing an image dot during a pass when the corresponding element of the mask has the first binary value;

wherein the masks have dimensions N×P that are sufficiently large to avoid perceptible repetitive patterns appearing, and in which the elements of the masks having the first binary value are distributed pseudo-randomly and substantially uniformly;

wherein the integers N and P are equal to or greater than 16.

19. The apparatus according to claim 18, said generating means further including assigning means for assigning substantially the same number of first binary value elements to each of the masks.

20. The apparatus according to claim 18, wherein the multi-dot print head includes at least one column of ejection orifices for ejecting ink droplets.

21. The apparatus according to claim 20, wherein the integer N is equal to the number of ejection orifices.

22. The apparatus according to claim 18, wherein the integers N and P are equal to or greater than 64.

23. The apparatus according to claim 18, wherein the integers N and P are equal.

24. The apparatus according to claim 18, said generating means further including:
   placing means for placing numbers in an N×P matrix in pseudo-random manner,
   allocating means for allocating the first binary value or the second binary value to each element of the masks as a function of the value of the number at the corresponding point in the matrix.

25. An apparatus for printing images with dots using at least one multi-dot print head that is movable relative to a print medium, comprising:
   a) generating means for generating a set of M different complementary binary masks in which each mask is in the form of a matrix of elements occupying N rows and P columns, where M, N, and P are integers greater than 1, such that:
      each of the N×P elements of the masks has a first binary value or a second binary value; and
      each point of the matrix corresponds to an element having the first binary value in one mask and in one mask only; and
   b) printing means for printing each portion of the image in M lasses of the print head, using M different masks in succession, including
      (i) scanning means for scanning the print head across a strip of N rows and using the same mask during each pass and a different, complementary mask for each successive scan; and
      (ii) printing means for printing an image dot during a pass when the corresponding element of the mask has the first binary value;
         wherein the masks have dimensions N×P that are sufficiently large to avoid perceptible repetitive patterns appearing, and in which the elements of the masks having the first binary value are distributed pseudo-randomly and substantially uniformly,
         choosing means for choosing the integers N and P so that N×p>>r and P×p>>r where p is the fundamental pitch between two image dots, and r is the critical pitch for pattern repetition at which a human eye presents maximum sensitivity.

26. The apparatus according to any one of claims 18 to 21, 22 and 23, said generating means generating masks in which each row is made up of groups of the first binary value and groups of the second binary value where each group includes at least two consecutive points of the same value.

27. The apparatus according to any one of claims 18 to 21, 22 and 23, further comprising:
   printing means for printing color images using a plurality of different print heads each corresponding to one color,
   allocating means for allocating the masks amongst the print heads by permutating the masks during successive passes.

28. An apparatus for printing images with dots using at least one multi-dot print head that is movable relative to a print medium, comprising:
   a) generating means for generating a set of M different complementary binary masks in which each mask is in the form of a matrix of elements occupying N rows and P columns, where M, N, and P are integers greater than 1, such that:
      each of the N×P elements of the masks has a first binary value or a second binary value; and
      each point of the matrix corresponds to an element having the first binary value in one mask and in one mask only; and
   b) printing means for printing each portion of the image in M passes of the print head, using M different masks in succession, including
      (i) scanning means for scanning the print head across a strip of N rows and using the same mask during each pass and a different, complementary mask for each successive scan; and
      (ii) printing means for printing an image dot during a pass when the corresponding element of the mask has the first binary value;
         wherein the masks have dimensions N×P that are sufficiently large to avoid perceptible repetitive patterns appearing, and in which the elements of the masks having the first binary value are distributed pseudo-randomly and substantially uniformly;
      said generating means further including:
         placing means for placing numbers in an N×P matrix in pseudo-random manner,
         allocating means for allocating the first binary value or the second binary value to each element of the masks as a function of the value of the number at the corresponding point in the matrix;
         wherein the integer M is equal to 2 and said allocating means allocates the first binary value or the second binary value to each element of each of a first mask depending on whether the corresponding number of the matrix is even or odd, and said generating means generates a second mask from the complement of the first mask.

29. An apparatus for printing images with dots using at least one multi-dot print head that is movable relative to a print medium, comprising:
   a) generating means for generating a set of M different complementary binary masks in which each mask is in the form of a matrix of elements occupying N rows and P columns, where M, N, and P are integers greater than 1, such that:
      each of the N×P elements of the masks has a first binary value or a second binary value; and
      each point of the matrix corresponds to an element having the first binary value in one mask and in one mask only; and
   b) printing means for printing each portion of the image in M passes of the print head, using M different masks in succession, including
      (i) scanning means for scanning the print head across a strip of N rows and using the same mask during each pass and a different, complementary mask for each successive scan; and
      (ii) printing means for printing an image dot during a pass when the corresponding element of the mask has the first binary value;
         wherein the masks have dimensions N×P that are sufficiently large to avoid perceptible repetitive patterns appearing, and in which the elements of the masks having the first binary value are distributed pseudo-randomly and substantially uniformly;
      said generating means further including:
         placing means for placing numbers in an N×P matrix in pseudo-random manner,
         allocating means for allocating the first binary value or the second binary value to each element of the masks as a function of the value of the number at the corresponding point in the matrix;

said allocating means allocating the first binary value to elements of the M-th mask whose locations correspond to numbers in the matrix that are within an M-th predetermined range of values, wherein the M predetermined ranges for the M masks are contiguous and non-overlapping.

30. An apparatus for printing images with dots using at least one multi-dot print head that is movable relative to a print medium, comprising:

a) generating means for generating a set of M different complementary binary masks in which each mask is in the form of a matrix of elements occupying N rows and P columns, where M, N, and P are integers greater than 1, such that:

each of the N×P elements of the masks has a first binary value or a second binary value; and each point of the matrix corresponds to an element having the first binary value in one mask and in one mask only; and b) printing means for printing each portion of the image in M passes of the print head, using M different masks in succession, including (i) scanning means for scanning the print head across a strip of N rows and using the same mask during each pass and a different, complementary mask for each successive scan; and (ii) printing means for printing an image dot during a pass when the corresponding element of the mask has the first binary value;

wherein the masks have dimensions N×P that are sufficiently large to avoid perceptible repetitive Patterns appearing, and in which the elements of the masks having the first binary value are distributed pseudo-randomly and substantially uniformly;

said generating means including:

allocating means for allocating the first binary value to an element of one of the masks without taking into account locations of first binary values previously allocated to other masks; and ensuring means for ensuring that said allocating means does not allocate the first binary value to a mask location which has already been allocated a first binary value.

31. The apparatus according to claim 30, said generating means generating the masks sequentially and including seeking means for seeking locations with minimum energy values to allocate the first binary values.

32. The apparatus according to claim 30, said ensuring means further including:

identifying means for identifying when said allocating means allocates the first binary value to a mask location which has already been allocated a first binary value, and reallocating means for reallocating one of the identified first binary values to a mask location adjacent to an mask original location of the reallocated first binary value.

33. The apparatus according to claim 30, wherein said masks are generated sequentially and the apparatus further comprises:

iterating means for iterating the functions of said allocating means and said ensuring means a number of times substantially equal to NP/M for each mask; and repeating means for repeating the functions of said iterating means M times to generate M masks.

34. The apparatus according to claim 30, wherein said masks are generated in parallel and the apparatus further comprises:

iterating means for iterating the function of said allocating means and said ensuring means M times with a different mask being processed at each iteration; and repeating means for repeating the function of said iterating means a number of times substantially equal to NP/M.

* * * * *